United States Patent

Copeland, III

[15] 3,701,128

[45] Oct. 24, 1972

[54] DETECTOR FOR MAGNETIC DOMAIN ARRANGEMENT

[72] Inventor: John Alexander Copeland, III, Gillette, N.J.

[73] Assignee: Bell Telephone Laboratories, Incorporated, Murray Hill, N.J.

[22] Filed: June 30, 1971

[21] Appl. No.: 158,288

[52] U.S. Cl. ..340/174 TF, 340/174 EB, 340/174 SR

[51] Int. Cl...........................G11c 19/00, G11c 11/14

[58] Field of Search...................340/174 TF, 174 EB

[56] References Cited

OTHER PUBLICATIONS

IBM Technical Disclosure Bulletin, Vol. 14, No. 1, June 1971, pg. 196–197

*Primary Examiner*—James W. Moffitt
*Attorney*—R. J. Guenther et al.

[57] ABSTRACT

A magnetoresistance detector for single wall domains exhibits particularly attractive properties if a captive domain is permanently associated with the element which has its resistance varied in the presence of an information representative domain. The latter domain varies the position of the captive domain. The arrangement relieves the constraints on positioning and alignment of a plurality of detectors as might be required for multiple channel domain propagation arrangements.

3 Claims, 7 Drawing Figures

INVENTOR
J. A. COPELAND III
BY Herbert M. Shapiro
ATTORNEY

DETECTOR FOR MAGNETIC DOMAIN ARRANGEMENT

FIELD OF THE INVENTION

This invention relates to data processing arrangements and more particularly to such arrangements in which information is represented as a pattern of single wall domains.

BACKGROUND OF THE INVENTION

The term "single wall domain" refers to a magnetic domain which is movable in a layer of a suitable magnetic material and is encompassed by a single domain wall which closes on itself in the plane of that layer.

Propagation arrangements for moving a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the lever and at a localized position offset from the position occupied by the domain. A succession of such fields causes successive movements of a domain.

One suitable propagation arrangement for moving a domain comprises a pair of serpentine conductors aligned along an axis and offset from one another therealong to provide domain displacement along the axis when pulsed alternatively with bipolar pulses. My copending application Ser. No. 49,273 filed June 24, 1970, now U.S. Pat. No. 3,636,531, discloses an arrangement where serpentine conductors define a multistage domain propagation arrangement. A rail along the above-mentioned axis defines first and second stable positions for a domain to first and second sides thereof in each of the stages. A domain is moved along the rail in response to the pulses in the conductors without changing sides. In practice, the rail forms a closed loop and a domain is stored initially in each stage to a reference (zero) side of the rail. A binary one is stored by displacing a domain laterally from the reference side to the paired position in an input stage of the channel leaving an absent domain in the reference side. A logical consequence of the arrangement is that a domain to the "one" side of the rail is accompanied by an absent domain in the reference side as it moves about the channel. Of course the opposite is true also.

One attractive detector for such domains comprises electrical connections to a magnetically soft element coupled to the domain propagation channel. The resistance of the element varies when a domain is present thus permitting a detection operation referred to as a magnetoresistance effect. But the amount of variation in the resistance of the element is determined by the magnetization of the element and the angle between the magnetization and a current path through the element as is well known. In order to maximize the resistance change, close attention must be given to these factors, a problem compounded by the use of a number of detectors which, as a result, must be closely aligned.

BRIEF DESCRIPTION OF THIS INVENTION

In accordance with this invention, the element which changes its resistance in a magnetoresistance detector for domains is offset from the path along which domains are moved. And the element has associated with it a relay domain which is moved from a first to a second position in the presence of a domain in the propagation channel. When the relay domain is in the first position the resistance of the element is a first low value. But when the relay domain is in the second position, the element is magnetically saturated parallel to the current path resulting in a relatively large change in the electrical resistance of the element. In addition, the arrangement is easily duplicated for each of a number of detectors thus relieving the alignment constraints mentioned above.

DETAILED DESCRIPTION

Figure 1:
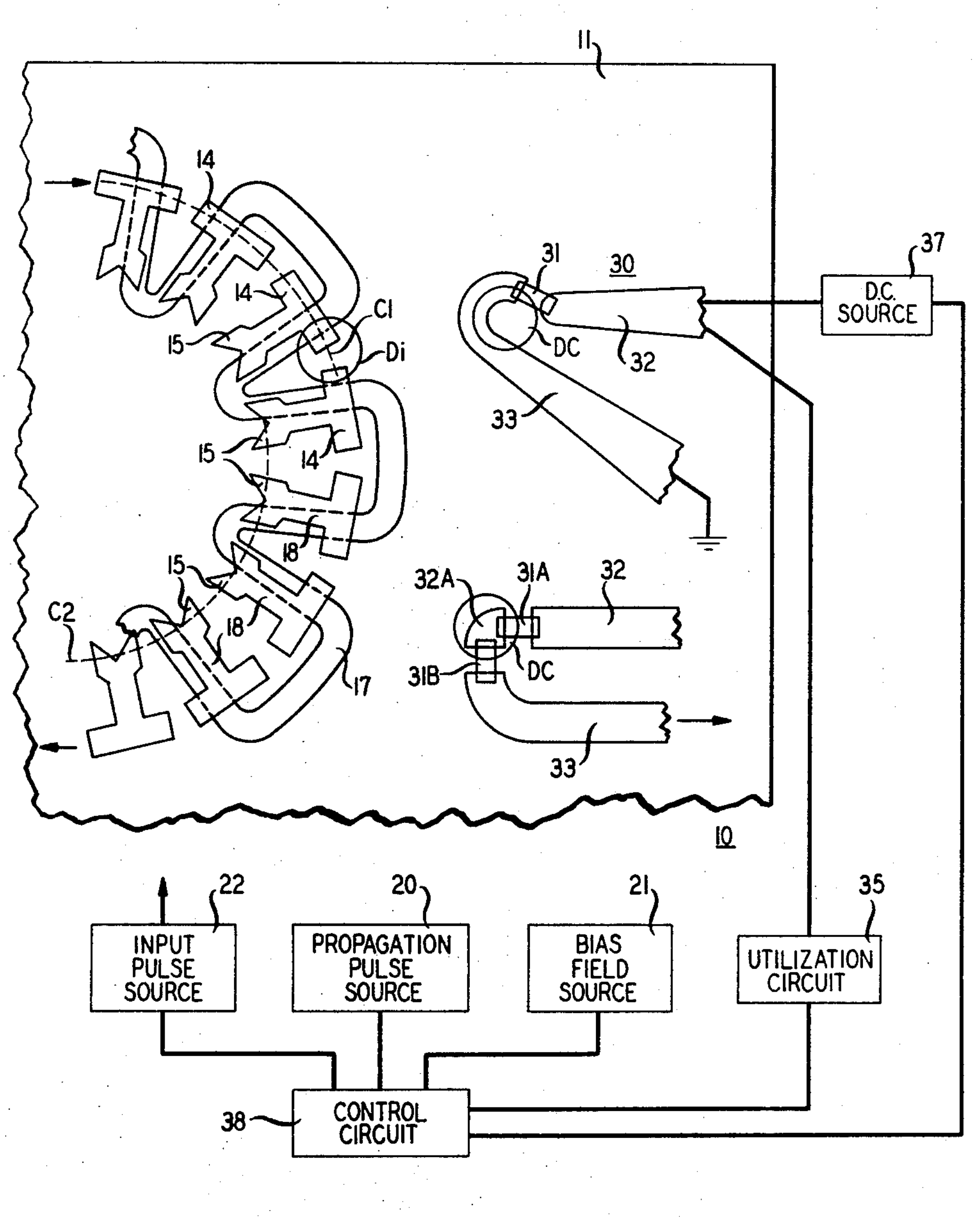
FIG. 1 is a schematic representation of a portion of a single wall domain arrangement with a magnetoresistance detector in accordance with this invention.

FIG. 1 shows a single wall domain arrangement 10 including a detector organized in accordance with this invention. The arrangement comprises a layer 11 of material in which single wall domains can be moved. A pattern of magnetic elements 14 and 15 define first and second channels C1 and C2 respectively in which domains can be moved. Elements 14 and 15 function to provide parallel domain propagation channels where a domain can occupy a position in one channel or the other. The elements thus serve as a rail disclosed in my above-mentioned copending application to define consecutive pairs of positions for a domain laterally displaced from one another and occupied in the alternative. Serpentine-shaped conductor 17 organizes the pairs of positions into stages by providing repetitive patterns of drive fields for movement of domain patterns along the channel when driven with bipolar pulses. Elements 18 are aligned perpendicular to the axis of the channel to define rest positions for domains offset from the positions to which domains are driven by the drive fields and thus provides unidirectional movement of domain patterns in the absence of two offset serpentine conductors as might otherwise be thought necessary. Although elements 14, 15, and 18 are referenced separately, they can be seen to comprise portions of a single element in the Figure.

The bipolar propagation pulses are supplied by a source represented by block 20 in FIG. 1. Domains moved in the channels are maintained a constant size by a bias field supplied by a source represented by block 21 of FIG. 1.

Domain patterns are introduced to the channel by lateral displacement of a domain from a reference side of the rail to an information (binary one) side which we assume to be the channel $C_1$. The displacement arrangement is disposed at an input position and comprises, typically, a pair of conductors connected to a pulse source represented by clock 22 of FIG. 1. The input arrangement is described fully in my above-mentioned copending application.

The present invention is directed primarily to the detection of the presence or absence of a domain at an output position in the arrangement of FIG. 1 and we will take the position of domain $D_i$ in FIG. 1 to be the output position. It is assumed that information is moving clockwise in the propagation channel and that the succession of bipolar pulses in conductor 17 results in the movement of a domain or absent domain into the output position at each alternation.

A detector in accordance with this invention is shown at 30 in FIG. 1. The detector comprises an element 31 of magnetically soft material, such as permalloy, which conducts an electrical current and exhibits a change in resistance to the current in the presence of a magnetic field. Electrical conductors 32 and 33 are connected to element 31 for applying a signal indicative of such a change in resistance to a utilization circuit 35. A DC source 37 applies a current to element 31 as indicated in FIG. 1.

Sources 20, 21, 22, and 37 and circuit 35 are connected to a control circuit 38 for synchronization and activation. The various sources and circuits herein may be any such elements capable of operating in accordance with this invention.

Figure 2:
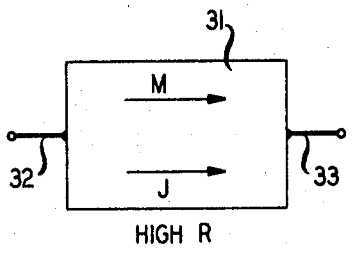
FIGS. 2 through 7 are schematic representations of a portion of the arrangement of FIG. 1 showing the magnetic condition thereof during operation.
Figure 3:
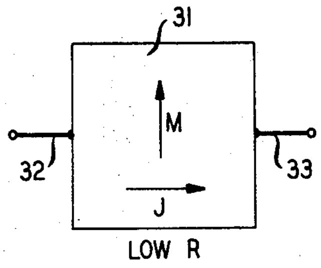
Figure 4:
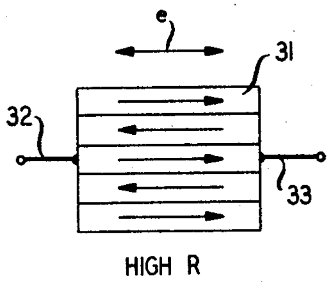
Figure 5:
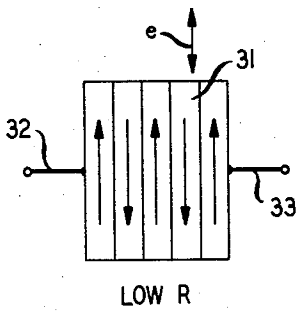

If when saturated magnetically, the magnetization $\overline{M}$ of element 31 is parallel rather than perpendicular to the current J through the element, the resistance R to the current is about 5 percent higher than it would be in the latter case. The two cases are illustrated in FIGS. 2 and 3. In addition, if element 31 were demagnetized, it would have a number of domains with $\overline{M}$ oppositely poled to one another but aligned along the easy axis. Again, if the domains are aligned parallel rather than perpendicular to the current flow, the resistance to the current is relatively high. The two demagnetized cases are illustrated in FIGS. 4 and 5 for alignment with an easy axis *e* parallel and perpendicular to the current flow respectively.

The output signal exhibited by element 31 is saturated by a single wall domain, and demagnetized in the absence of a single wall domain, depends on the angle between the easy axis of the element and the direction of current flow as well as the direction of the field from the domain. Since elements 31 for a number of like detectors in typical single wall domain devices are at a variety of orientations in the plane of the layer of material in which domains move, there is no practical way of aligning easy axes. Consequently, the output signal from a number of detectors would vary from zero to the maximum in any practical situation.

Figure 6:
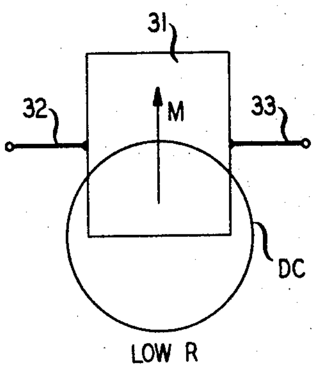
Figure 7:
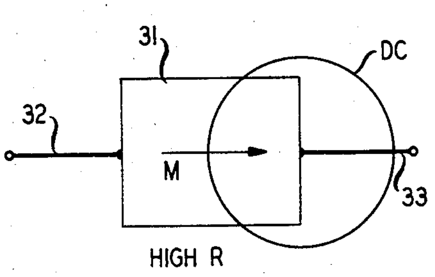

In accordance with the present invention a domain DC shown in FIG. 6 is permanently associated with element 31 in the position shown, in the absence of an information domain Di moving along the channel C1 defined by elements 14 of FIG. 1. In the presence of domain $D_i$, domain $D_c$ rotates with respect to element 31 to the position shown in FIG. 7. Domain Dc maintains element 31 always in a saturated condition. When the domain ($D_c$) is in the position shown in FIG. 6, the magnetization is aligned perpendicular to the current flow as is clear from a comparison of FIGS. 3 and 6. On the other hand, when an information domain rotates domain Dc to the position shown in FIG. 7, the magnetization of element 31 is parallel to the current flow as is clear from a comparison of FIGS. 2 and 7 producing a high resistance condition.

The resulting signal responsive to the rotation of a domain permanently associated with its magnetoresistive element due to an interaction with the passage of an information domain is due to the rotation of magnetization of a saturated magnetoresistive element rather than a change between a saturated and a demagnetized condition as is the case in prior art arrangements.

The arrangement of a captive domain associated with a magnetoresistive element is a particularly convenient arrangement. The reason for this is that the field from the domain adjusts the direction of magnetization of the element to the proper direction irrespective of the direction of the easy axis of the element. Consequently, variations in orientation of the long dimensions of say rectangular or scimitar shaped elements is a negligible problem. Moreover, when an information domain interacts with such a captive domain, the latter does not move away from the element easily. Rather, it will move to higher and higher energy conditions still coupled to the element. The highest such condition is when the captive domain rotates 90° about the element so that the current passes directly over the domain. Since the normal orientation of the domain is self adjusting to the lowest resistance condition, any interaction with an information domain tends to drive the captive domain into the highest resistance condition for a number of detectors, a relationship which is relatively easy to achieve regardless of the actual easy direction orientations of the various magnetoresistive elements therein.

The use of a captive domain in accordance with this invention has the further advantage that the magnetoresistive elements and connections thereto need not be in the path of information domains thus easing the requirements of placement and the associated "real estate" problems as is well understood. Moreover, relatively little force is required to rotate the captive domain thus reducing any problems due to the necessity for geometry changes or drive requirements which might otherwise arise to compensate for the necessity for larger forces.

Element 31 has been shown as rectangular for simplicity. The element may, of course, have a variety of different shapes to, for example, correspond to the contour of a domain wall as suggested by the scimitar shape mentioned above. Also, a permalloy bar oriented radially with respect to the scimitar may be used to provide a pole with respect to which the captive domain easily centers itself. FIG. 1 shows also a detector arrangement using two magnetoresistance elements 31A and 31B joined by conductor 32A and having connections 32 and 33. Operation is entirely analagous to that described above except that double the output signal of the single element arrangement is achieved as is consistant with prior art understanding.

It may be recognized that the elements 31, 31A and 31B are oriented differently from one another as might occur when multiple detectors are employed in a single wall domain arrangement. The difficulty in aligning the easy axis of such element, of course, is clear when it remembered that the easy axis are defined by the direction of a magnetic field when the elements are deposited. To align the easy axis of an element with say the long dimension in each instance, several separate depositions would be required.

A detector of the type shown in FIG. 1 has been operated employing bipolar pulses having magnitudes of 60 milliamperes and a duration of 3 microseconds for moving domains with a diameter of 125 microns in Y $F_eO_3$. A captive domain is rotated as described by a force due to an information domain 250 microns to give an output signal of 3 millivolts. A bias field of 25 oersteds maintained the domain diameter constant. Element 31 was 1,000 angstrom units thick and 50 micron square (80–20) permalloy with a magnetization of 8,000 gauss. The dc current was 30 milliamperes.

What has been described is considered only illustrative of the principles of this invention. Therefore, a variety of modifications thereof can be devised by those skilled in the art in accordance with those principles within the spirit and scope of this invention.

What is claimed is:

1. A single wall domain arrangement comprising a layer of material in which single wall domains can be moved, a pattern of magnetically soft elements for defining a propagation channel in said layer, an additional magnetically soft element adjacent said path, means for applying an electrical signal to said additional element, a relay single wall domain coupled to said additional element, said additional element and said domain coupled thereto being disposed such that a domain being moved along said channel moves said relay domain in a manner to alter the electrical resistance of said additional element.

2. A magnetoresistive detector arrangement for detecting the presence or absence of a domain in a domain propagation channel comprising a layer of material in which domains can be moved, means for moving domains along said channel, a magnetoresistive element spaced apart from said channel a distance such that the magnetization of said element is only negligibly affected by a domain moved in said channel, and first and second electrical connections to said element, wherein said arrangement includes means for maintaining a captive single wall domain in said layer coupled to said magnetoresistive element in a manner such that a domain moved in said channel interacts with said captive domain to rotate the magnetization thereof with respect to said magnetoresistive element.

3. A magnetoresistive detector in accordance with claim 2 wherein said magnetoresistive element has a magnetization such as to be saturated by said captive domain.

* * * * *